Dec. 26, 1933.                H. F. FISHER                1,940,794
                        TREATED OIL SETTLING DEVICE
                   Filed Nov. 14, 1927        2 Sheets-Sheet 1

Dec. 26, 1933.  H. F. FISHER  1,940,794
TREATED OIL SETTLING DEVICE
Filed Nov. 14, 1927   2 Sheets-Sheet 2

INVENTOR:
HARMON F. FISHER,
BY
Ford W. Harris
ATTORNEY.

Patented Dec. 26, 1933

1,940,794

UNITED STATES PATENT OFFICE 1,940,794

TREATED OIL SETTLING DEVICE

Harmon F. Fisher, Long Beach, Calif., assignor to Petroleum Rectifying Company of California, Los Angeles, Calif., a corporation of California Application November 14, 1927
Serial No. 233,292

19 Claims. (Cl. 210—55)

My invention relates to gravitational settling apparatus, and it relates particularly to a settling apparatus for settling water and foreign matter from oil.

In the petroleum industry emulsions of oil and water are electrically treated so that the water particles are agglomerated into masses of sufficient size to gravitate from the oil. The gravity separation is then accomplished either within the electrical treater or in separate apparatus.

It is an object of this invention to provide a settling apparatus in which the settling action of one material from a liquid will be faster than in any gravitational settling apparatus known to me; and it is also an object of the invention to provide a settling apparatus having compactness and volume.

In my apparatus I permit the liquid to flow between closely stacked or nested plates or trays so arranged that the suspended, agglomerated particles to be separated, fall through a relatively short path substantially transverse to the flow of a liquid, before striking a collecting surface upon which they can collect, accumulate, and run off through a conducting pipe, conduit or trough to the lower part of the settling chamber. I find that in this way within practical limitations I can increase the settling capacity of a given volume roughly by the number of times the total height of the settling space is subdivided by the settling trays. Thus, with two settling spaces of half the height, but having the same total height as the original settling volume I have approximately twice the settling capacity. With four spaces I have substantially four times the settling capacity, etc.

It is another object of my invention to provide a gravitational settling apparatus in which the separating material will fall but a short distance to separate from the liquid.

The liquid to be separated from the water or other foreign particles in suspension is introduced in my invention to the stack of trays through four or more distributing pipes. At the level of the underside of each separating tray there are two holes directed toward the adjacent or neighboring distributing pipe. The size of the hole is designed to give a very moderate back pressure in the vertical distributing pipe, but sufficient to insure uniform distribution between the various trays. In order that the oil issuing from these holes does not stir up the material previously settled on the tray below, a baffle tray is introduced immediately below said holes but high enough above the settling tray below to permit an adequate settling and separating action to proceed without hindrance.

It is one of the objects of my invention to provide a gravitational settling apparatus of the character mentioned in which the incoming mixture will not interfere with the settling action going on in the apparatus.

It is a further object of the invention to provide a gravitational settling apparatus in which the flow of the mixture in the apparatus is gradually decreased as it passes through the apparatus to facilitate settling action.

Other objects and advantages of my invention will be pointed out in the following description.

The invention may be best understood by referring to the accompanying drawings in which the invention is illustrated.

Figure 1:
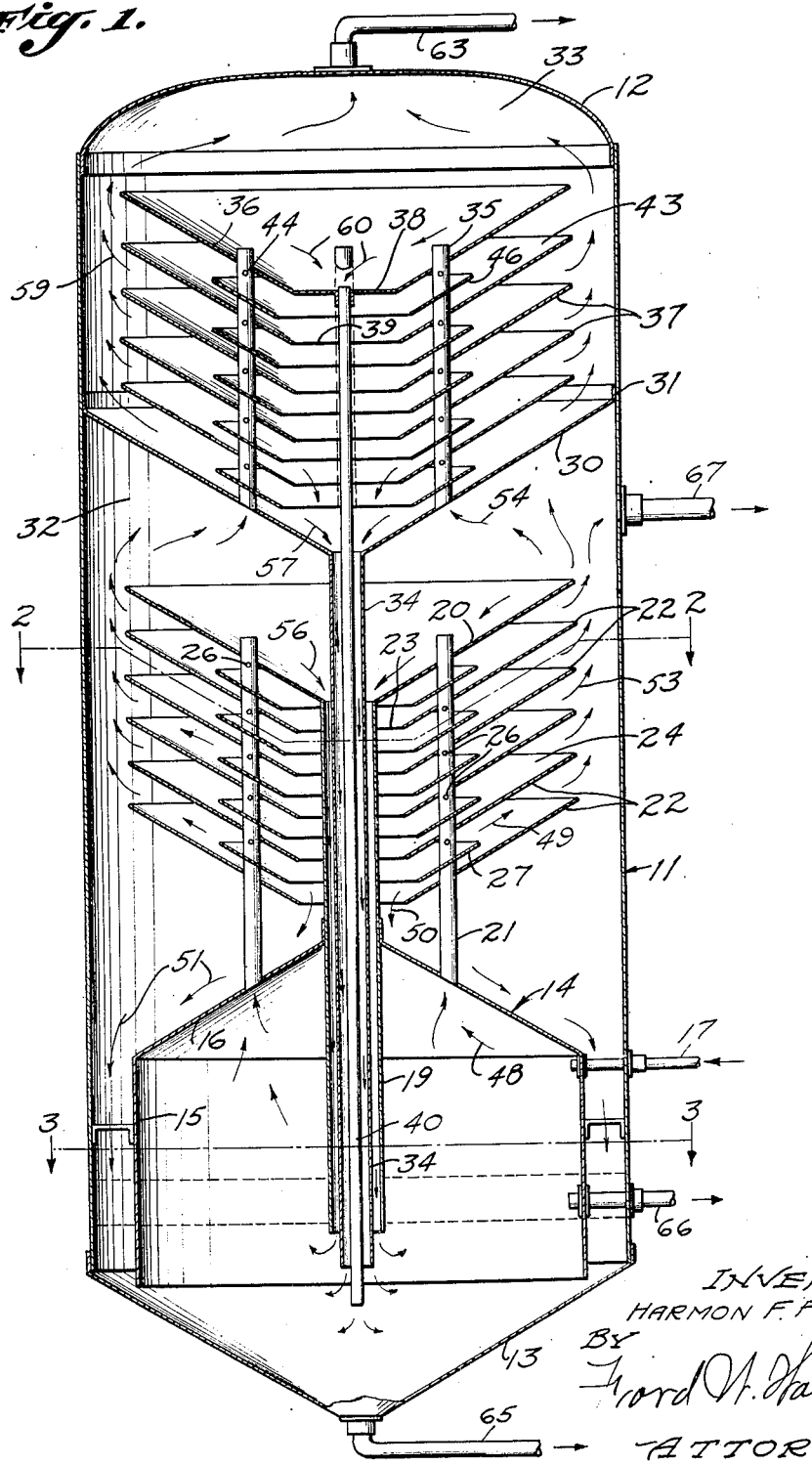
Fig. 1 is a vertical section through a preferred embodiment of the invention.
Figure 2:
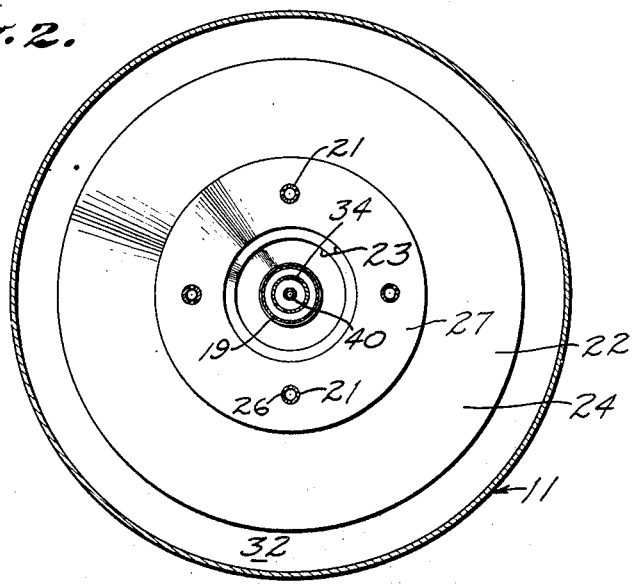
Fig. 2 is a section taken on the line 2—2 of Fig. 1.
Figure 3:
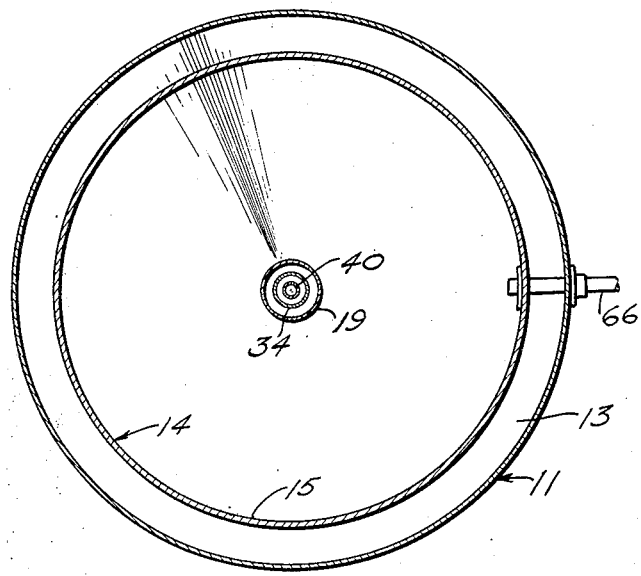
Fig. 3 is a section taken on the line 3—3 of Fig. 1.

The form of the invention illustrated in the drawings consists of a closed tank 11 having a tight top 12 and a tight conical bottom 13. Suitably supported in the tank 11 near the lower end thereof is a shell 14. The shell 14 is open at the bottom, has a cylindrical side wall 15 slightly smaller in diameter than the tank 11, and a conical top 16. Liquid to be subjected to the settling action in the apparatus is introduced into the interior of the shell 14 by a pipe 17.

Extending vertically through the top of the shell 14 is an outer tube 19. The lower end of this outer tube 19 terminates a short distance above the lower part of the shell 14. The upper end of the outer tube 19 has a conical baffle 20 attached thereto, the outer diameter of this conical baffle 20 being smaller than the diameter of the tank 11. Extending upward from the shell 14 and communicating with the interior thereof are vertical supply pipes 21 each of which is open at the bottom and closed at the upper end where it is connected to the conical baffle 20. In the drawings I show four vertical supply pipes 21. Arranged below the baffle 20 is a plurality of baffles 22 which are of the same outer diameter as the baffle 20 but which have openings 23 provided therein which are of a larger diameter than the outer tube 19 and through which the outer tube 19 extends. These baffles 22 are spaced a distance apart so as to provide settling passages 24. It will be noted that these settling passages 24 are annular and slant upward and outward. The baffles 22 may be secured in place by suitable attachment to the vertical supply pipes 21. Openings 26 are provided in the supply pipes 21 in each of the settling passages 24, preferably near the upper parts of these passages, and direct a stream of the mixture tangentially thereinto. In each of the settling passages 24 are conical shields 27 each of which is arranged between the openings 26 and the next lower baffle 22 defining the bottom of each of the settling passages 24.

Secured in the tank 11 above the baffle 20 is a cone-shaped pan 30 which is attached to the tank at 31 so that the tank is separated into a primary chamber 32 below the pan 30 and the secondary chamber 33 above the pan 30. Connected to the inner lower part of the pan 30 is an intermediate tube 34 which extends downward inside the outer tube 19 and terminates below the lower end of this outer tube 19. Extending upward from the pan 30 are vertical supply pipes 35, the lower ends of which are in communication with the primary chamber 32 and the upper ends closed. Supported by these vertical supply pipes 35 are conical baffles 36 and 37. The conical baffle 36 has a central flat part 38 while the baffles 37 have central openings 39. Extending downward from the central part 38 of the baffle 36 is a central tube 40. This central tube 40 extends downward through the intermediate tube 34 and terminates below the lower end thereof. The baffles 36 and 37 are spaced apart in the same manner as the baffles 20 and 22 and provide annular settling passages 43 which slope upward and outward. Openings 44 are provided in the vertical supply pipes 35, these openings connecting to the settling passages 43 near the upper parts thereof. Placed in each settling passage 43 is a conical and annular shield 46 disposed between the openings and the baffle defining the lower part of each of the settling passages 43.

In the operation of the invention the mixture from which certain particles are to be separated by gravity flows from the inlet pipe 17 as indicated by arrows 48 of Fig. 1. This mixture passes upward through the vertical supply pipes 21 and through the openings 26 and into the settling passages 24. The openings 26 are preferably of such a size that the mixture will not flow too rapidly into the settling passages 24 and so that there will be an even flow. The mixture flows outward into the settling passages 24 as indicated by arrows 49. Any particles which are heavy enough to settle from the liquid will fall downward onto the lower surfaces defining the settling passages, these surfaces being conveniently called "settling surfaces". The collected material, which may be water or other foreign matter, flows downward and inward from the baffles and drops through the openings 23 as indicated by arrows 50 onto the upper conical part 16 of the shell 14. These precipitating portions pass downward as indicated by arrows 51 to the lower part of the tank 11. As the mixture passes outward in the annular passages 24, the rate of flow thereof gradually decreases due to the flow area being greater with the increasing radii. This greatly assists in the settling action occurring in the settling passages. The shields 27 are provided for the purpose of preventing the inflowing mixture passing through the openings 26 from disturbing the collected matter which is flowing downward on the collecting surfaces of the settling passages 24.

It is found that without these shields 27 there is a tendency for agitation which interferes with the settling action. The mixture passes upward around the baffles 20 and 22, as indicated by arrows 53, and flows into the vertical supply tubes 35, as indicated by arrows 54. Any liquid which settles from the mixture at a point above the upper baffle 20 will fall onto the baffle 20 and pass into and through the outer tube 19, as indicated by arrows 56. The mixture passes through the openings 44 into the settling passages 43 between the baffles 36 and 37. In these settling passages the same action takes place as previously explained in respect to the settling passages 24. The precipitates fall onto the collecting surfaces and pass downward and inward, falling through the openings 39. These precipitates flow, as indicated by arrows 57, into the intermediate tube 34 and to the bottom of the tank 11. The shields 46 prevent interference with the settling action in the same manner as do the shields 27. The mixture passes from the outer parts of the settling passages 43, as indicated by the arrows 59, at a very slow rate of speed. Any precipitates which fall from the mixture after it reaches the upper part of the tank 11 will drop onto the baffle 36 and will flow as indicated by arrows 60, through the inner tube 40 to the bottom of the tank. By the time the mixture reaches the upper part of the tank 11, all the precipitates or suspended matter has been separated therefrom. If the mixture which is being treated in the apparatus is a treated emulsion, the water particles will be entirely separated from the oil by the time the oil reaches the upper part of the tank 11 and dry oil will be withdrawn through the outlet pipe 63 which is attached to the upper part of the tank 11.

The precipitates or other suspended matter falls, as previously explained, to the lower part of the tank 11 and is withdrawn through a pipe 65. Connected to the tank 11 and extending through the cylindrical wall 15 of the shell 14 is a pipe 66 which is adapted to withdraw the bottom settlings from the apparatus. In the oil producing industry bottom settlings is a mixture of oil and water which is stratified between the treated oil and the water. It is economical practice to re-treat bottom settlings to separate the water and oil. In my invention provision is made for withdrawing bottom settlings. At the upper part of the primary chamber 32 there is connected a pipe 67 for the purpose of withdrawing partly treated mixture from the apparatus. When the apparatus is being used to settle treated emulsion, the emulsion when it is passed through the first series of settling passages may be termed "conditioned oil" and is suitable to form a dielectric barrier in dehydrating apparatus. In this invention provision is made for withdrawing this conditioned oil from the apparatus for use in a dehydrator.

The important part of the invention is embodied in the provision of a number of settling passages which are comparatively narrow so that the precipitates are required to fall but a short distance before striking a collecting surface. As pointed out before, the rapidity of settling is substantially in inverse proportion to the distance that the precipitates are required to fall. By arranging the baffles, as shown, it is possible to get a maximum of settling action in a given space. The feature of using conical baffles is important since it directs the precipitates in one direction, whereas the flow of the mixture or liquid is in the opposite direction. The advantage of using annular settling passages is that the rate of flow of the mixture decreases as it passes to the periphery of the settling passages which, of course, assists in the settling of the precipitates. The shields 27 and 46 are found to be advantageous in preventing the collected precipitates from being agitated and again entering into the outward flowing mixture.

The invention has a particular utility in the separation of water from the oil of a treated emulsion. The invention, however, is not limited to that art but is useful wherever precipitates must be settled from a liquid in a short period of time and in a small space.

I claim as my invention:

1. A gravitational settling apparatus consisting of: a series of inclined baffles providing a series of settling passages; means for introducing into said settling passages a mixture from which a material is to be separated by gravitation, said material falling onto said baffles and flowing downward therealong; and shields placed in said settling passages between the points where mixture is introduced and the lower baffles.

2. A gravitational settling apparatus consisting of: a series of conical inclined baffles providing a series of settling passages; means for introducing into said settling passages a mixture from which a material is to be separated by gravitation, said material falling onto said baffles and flowing downward therealong; and shields placed in said settling passages between the points where mixture is introduced and the lower baffles.

3. A gravitational settling apparatus consisting of: a series of inclined baffles in superimposed relation providing a series of settling passages; means for introducing into said settling passages a mixture from which a material is to be separated by gravitation, said material falling onto said baffles and flowing downward therealong; and shields placed in said settling passages between the points where mixture is introduced and the lower baffles.

4. A gravitational settling apparatus consisting of: a series of conical baffles providing a series of inclined settling passages; and a supply means for supplying a mixture to the lower parts of each of said settling passages, said mixture flowing upward therethrough, and the material to be settled falling onto the lower baffles, flowing downward therealong, said supply means introducing said mixture substantially perpendicular to the direction of flow of said material along said lower baffle.

5. A gravitational settling apparatus consisting of: a series of conical baffles providing a series of inclined settling passages; a supply means for supplying a mixture to the lower parts of each of said settling passages, said mixture flowing upward therethrough, and the material to be settled falling onto the lower baffles, flowing downward therealong; and conical shields arranged in said settling passages below the points of entrance of said mixture.

6. A gravitational settling apparatus consisting of: a series of conical baffles providing a series of inclined settling passages; a supply means for supplying a mixture to the lower parts of each of said settling passages, said mixture flowing upward therethrough, and the material to be settled falling onto the lower baffles, flowing downward therealong; and conical shields arranged in said settling passages parallel to said baffles below the points of entrance of said mixture.

7. In a settling device, the combination of: a pair of superimposed baffles defining a settling passage; a supply pipe extending through said settling passage and having an opening through the walls thereof communicating with said settling passage; a shield in said settling passage through which said pipe passes, said shield being positioned between said opening and one of said baffles; and means for introducing into said supply pipe a mixture which it is desired to separate into its constituent parts.

8. In a settling device, the combination of: a tank; a shell in said tank providing a conical top, said shell being smaller than said tank; a pair of conical baffles above said shell and defining a settling passage therebetween; means for supplying a mixture to said shell; and means for conducting said mixture from said shell to said settling passage wherein the heavier constituent of said mixture moves downward along the lower of said baffles and around said shell into the lower portion of said tank, the lighter constituent of said mixture rising to the top of said tank.

9. A combination as defined in claim 8 including a pipe communicating with the apex of the uppermost baffle and extending downward to the bottom of said tank.

10. In a settling device, the combination of: a tank; a conical pan extending across said tank with apex downward, said apex communicating with the lower end of said tank; walls defining settling passages above said pan; and means communicating with the space immediately below said pan for conducting a mixture which it is desired to separate upward into said passages, the heavier constituent falling to said pan and being therefrom conducted to the lower end of said tank, the lighter constituent rising to the top of said tank.

11. In a settling device, the combination of: a tank; a conical pan extending across said tank with apex downward; a primary pipe communicating with the space above said pan at said apex and with the lower portion of said tank; a plurality of conical baffles above said pan and interspaced to form settling passages, there being central openings formed in the lower end of each of said baffles except the uppermost; a secondary pipe communicating with the lower portion of the space above the uppermost baffle and extending downward through the central openings of said baffles and through said primary pipe to the lower end of said tank; and means communicating with the space immediately below said pan for conducting a mixture which it is desired to separate upward into said passages, the heavier constituent falling to said pan and being therefrom conducted to the lower end of said tank, the lighter constituent rising to the top of said tank.

12. In a settling device, the combination of: a pair of inclined baffles mounted in superimposed relationship and providing an inclined settling passage, the lower of said baffles providing a central opening; perforated pipe means extending into a section of said settling passage which is intermediate the upper and lower ends thereof; and means for supplying to said pipe means a mixture the constituents of which are to be separated, said perforations of said pipe means discharging a stream of said mixture into said settling passage at said section, the heavier of said constituents flowing downward through said inclined settling passage and through said central opening, the lighter constituents rising in said settling passage.

13. In a settling device, the combination of: a pair of inclined baffles mounted in superimposed relationship and providing an inclined settling passage; and means for discharging a stream of the mixture to be treated into a section of said settling passage which is closer to the upper of said baffles than to the lower of said baffles.

14. In a settling device, the combination of: a pair of inclined baffles mounted in superimposed relationship and providing an inclined settling passage; and means for discharging a stream of the mixture to be treated into a section of said settling passage which is intermediate the upper and lower ends thereof and at a point which is closer to the upper of said baffles than to the lower of said baffles.

15. In a high-capacity settling device, the combination of: a plurality of inclined baffles mounted in superimposed relationship and providing a plurality of inclined settling passages; and pipe means extending through said inclined baffles in fluid-tight relationship with each of said inclined baffles and extending through said inclined settling passages at sections intermediate the ends thereof, said pipe means providing openings through the walls thereof communicating with each of said settling passages at said intermediate sections for supplying a mixture thereto.

16. In a settling device, the combination of: a pair of inclined baffles mounted in superimposed relationship and providing an inclined settling passage therebetween; means for introducing a mixture into said settling passage, the heavier constituent of said mixture falling to the lower of said baffles and moving downward therealong, and the lighter constituent of said mixture rising through said settling passage; and means in said settling passage for preventing the said constituents moving in said settling passage from being agitated by the incoming mixture discharged from said first-named means.

17. In combination: a tank; a shell in said tank, said shell being in the form of an inverted cup communicating with the lower end of said tank; settling means in said tank; means for supplying a mixture to the interior of said shell; and means communicating with the upper interior of said shell and with said settling means for conducting the mixture to said settling means, the heavier constituent of said mixture falling to the bottom of said tank around said shell, and the lighter constituent rising to the top of said tank.

18. In a settling device, the combination of: a plurality of superimposed baffles providing a plurality of inclined settling passages, each baffle providing an opening and the openings of said baffles being in vertical alignment; a pipe extending through said openings; means for closing one end of said pipe; walls defining passages communicating with the interior of said pipe, each of said passages opening on one of said settling passages at a section intermediate the ends thereof; and means for supplying the mixture to be separated to that end of said pipe which is not closed whereby said mixture flows through said passages and into said settling passages, the heavier constituent thereof dropping to the lower walls of said settling passages and flowing from the lower ends of said baffles and the lighter constituent thereof rising into contact with the upper walls of said settling passages and moving from the upper ends of said baffles.

19. In a settling device, the combination of: a tank; a wall in said tank; means for introducing the mixture of constituents to be separated to the space below said wall; pipe means secured in fluid-tight relationship with said wall and communicating with said space to conduct said mixture upward above said wall, said pipe means providing openings therein through which said mixture discharges; means for closing the upper end of said pipe means above said openings whereby said mixture is forced through said openings rather than from the end of said pipe means; and a plurality of inclined baffles above said wall and providing one or more inclined settling passages, at least one of said openings discharging into each of said settling passages, said pipe means extending in fluid-tight relationship with said baffles and through said settling passages at sections intermediate the upper and lower ends thereof whereby said mixture is introduced into said settling passages intermediate its ends, the heavier of said constituents flowing downward through said settling passages to the bottom of said tank and the lighter of said constituents flowing upward through said settling passages and into the upper end of said tank.

HARMON F. FISHER.